United States Patent [19]
Akahori et al.

[11] Patent Number: 5,310,587
[45] Date of Patent: May 10, 1994

[54] WRAPPING FOR FOODS

[75] Inventors: Kouji Akahori, Tokyo; Hiroshi Kanehira, Okayama, both of Japan

[73] Assignee: Kuraray Co., Ltd., Kurashiki, Japan

[21] Appl. No.: 655,843

[22] Filed: Feb. 14, 1991

[30] Foreign Application Priority Data

Feb. 21, 1990 [JP] Japan .................. 2-17206[U]

[51] Int. Cl.⁵ .................. B65D 30/08; B65D 81/26
[52] U.S. Cl. .................. 428/35.2; 428/34.3;
428/35.4; 428/35.6; 428/74; 428/286; 428/365;
428/311.5; 428/311.7; 428/507; 428/512;
428/534; 428/535; 383/113; 383/117; 206/204
[58] Field of Search .......... 428/35.6, 34.2, 36.2,
428/284, 503, 507, 511–512, 534–535, 286, 297,
311.5, 311.7, 74, 34.3, 35.2, 35.4, 224, 286, 365;
383/113, 117; 206/204

[56] References Cited

U.S. PATENT DOCUMENTS

| | | | |
|---|---|---|---|
| 4,242,418 | 12/1980 | Kitagawa | 428/512 |
| 4,861,632 | 11/1989 | Caggiano | 428/34.3 |
| 4,904,520 | 2/1990 | Dumas et al. | 428/286 |
| 4,929,480 | 5/1990 | Midkiff et al. | 428/35.6 |
| 4,977,031 | 12/1990 | Temple | 428/507 |
| 4,983,450 | 1/1991 | Yanagihara et al. | 428/286 |
| 4,984,907 | 1/1991 | Power | 383/109 |
| 5,068,139 | 11/1991 | McReynolds | 428/512 |

FOREIGN PATENT DOCUMENTS

| | | |
|---|---|---|
| 0188005 | 7/1986 | European Pat. Off. . |
| 0185891 | 9/1985 | Japan . |
| 1037877 | 8/1966 | United Kingdom . |
| 1480926 | 7/1977 | United Kingdom . |
| 2031849 | 10/1978 | United Kingdom . |

*Primary Examiner*—Ellis P. Robinson
*Assistant Examiner*—Charles R. Nold
*Attorney, Agent, or Firm*—Oblon, Spivak, McClelland, Maier & Neustadt

[57] ABSTRACT

Provided are wrappings for foods comprising a laminated composite sheet which comprises an impermeable sheet, an absorbent fiber sheet and a hydrophobic fiber sheet, said hydrophobic fiber sheet having a water resistance of at least 5 cmH$_2$O and an air permeability of at least 10 c/cm$^2$/sec. Also provided are bags and boxed fabricated from the above wrappings.

These wrappings are microwaveable and have heat insulation property.

8 Claims, 2 Drawing Sheets

WRAPPING FOR FOODS

BACKGROUND OF THE INVENTION

1. Field of the Invention

The present invention relates to a wrapping material for foods such as hamburger and OKONOMIYAKI, which can be heated with its contents in a microwave.

2. Description of the Related Arts

In recent years, as the diversification of foods proceeds, fast foods such as hamburgers, hot dogs and OKONOMIYAKI (a thin, flat cake of unsweetened butter fried with bits of vegetables and meats) have been widely spreading. These foods are taken in restaurants as they are cooked warm, or foods are consumed warm in resturants or then eaten outside or at home. When people eat such takeouts at home, they usually rewarm the takeouts in their microwaves. In any case these takeouts are wrapped with impermeable sheets that do not allow water or oil to penetrate, in order to prevent dirtying the customer's hands and clothes with oozing sauce, ketchup or the like. Sometimes they are additionally placed in styrofoam or like containers.

Available impermeable sheets for this purpose are laminates of tissue/polyethylene or polypropylene film, tissue/aluminum foil, tissue/aluminum foil/polyethylene film, and the like. These sheets are formed into bags as they are, partly backed with an absorbent sheet, partly replaced by a permeable water-proof film or perforated film, or by like means.

Where warm foods just after being cooked, such as hamburger, are wrapped with these impermeable sheets, there occurs a problem wherein excess vapor inside the wrap condenses on the inside surface and the water drops formed are absorbed into the food contained therein, thereby impairing the taste or changing the shape. If the foods are wrapped after being cooled, vapor will generate upon heating in microwave and then condense to produce similar results. Where the inside is covered with an absorbent sheet, the condensed water drops are absorbed in the sheet to make it wet, whereby the wet sheet touches the food to moisten and impair its taste. Furthermore, absorbent sheets have little heat insulation ability and the foods contained therein, when taken out, cool in a short time.

With bags partly comprised of a permeable water-proof film or a perforated film are used, the effect of removing vapor is not sufficient and dew drops still tend to form inside the film and cause similar problems. In addition, impermeable water-proof sheets are very expensive and perforated films have a drawback of leakage of sauce or ketchup through the holes. The use of these films for part of a bag has another drawback of increasing the manufacturing cost due to complex manufacturing processes and high percentage defect caused by poor adhesion or the like.

SUMMARY OF THE INVENTION

Accordingly, an object of the present invention is to provide a wrapping with which the following conditions 1) through 4) are satisfied:

1) warm food wrapped therein just after being cooked does not generate condensation inside the wrap which will moisten the surface of the food to impair its taste;

2) the sauce, ketchup, butter or the like of the food wrapped does not ooze out to make dirty the hand and clothes from being soiled;

3) when the food wrapped cools and is then reheated in a microwave, vapor that generates does not condense inside the wrap so thereby allowing the food to become tasty and warm again; and 4) the wrapped food is kept warm for a long time thanks to high heat insulation of the wrapping.

To achieve the above object, the present invention provides a wrapping for foods comprising a laminate of at least three layers comprising an impermeable sheet, a sheet of an absorbent fiber and a sheet of a hydrophobic fiber, said sheet of a hydrophobic fiber having a water resistance of at least 5 cmH$_2$O and an air permeability of at least 10 cc/cm$^2$/sec and being positioned in said laminate at the side that contacts the food contained.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENTS

Figure 1:
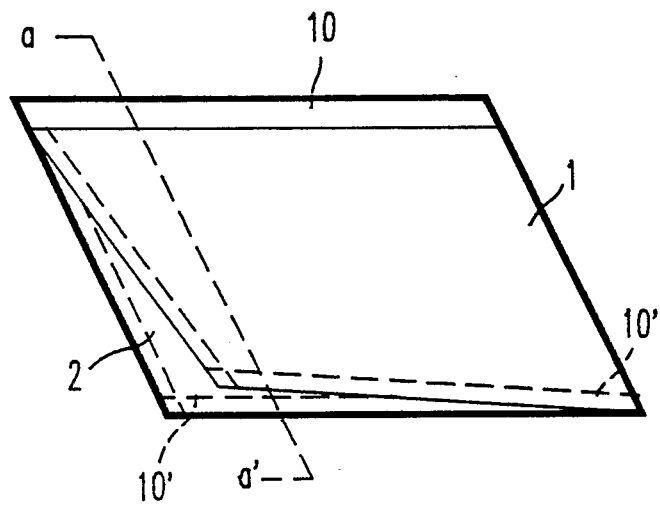
FIG. 1 is a perspective view showing an embodiment of the wrapping sheet of the present invention, fabricated into a bag formed by folding the sheet and sealing one side neighboring the fold of the folded sheet.
Figure 2:
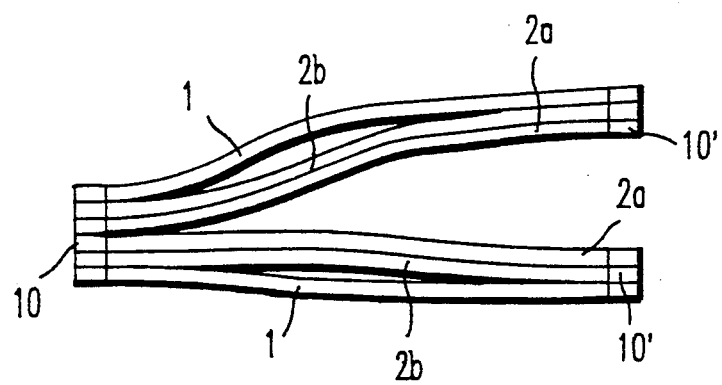
FIG. 2 is a schematic view of the cross section of the bag of FIG. 1, taken on a-a'.
Figure 3:
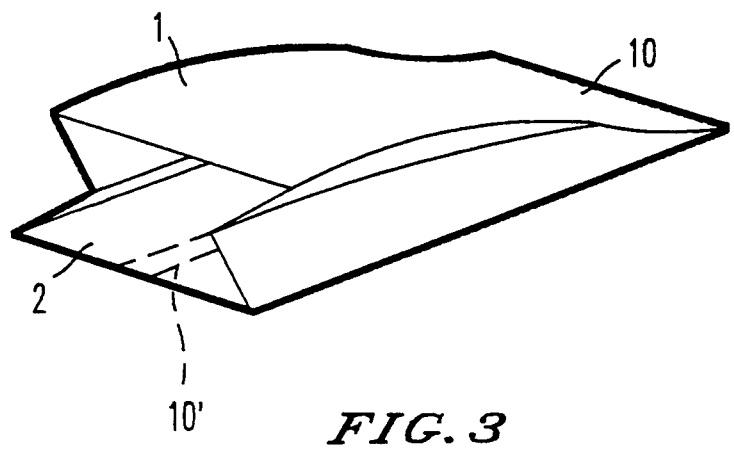
FIG. 3 is a perspective view of another embodiment of the present invention comprising an open bag provided with a gore.

The wrapping for foods of the present invention are laminates of at least 3 different sheets. The innermost layer that touches the wrapped food is a hydrophobic fiber sheet, the intermediate layer an absorbent fiber sheet and the outer layer an impermeable sheet. The innermost layer and the intermediate layer may beforehand be integrally laminated with each other, which is preferred for the case where they are fabricated into bags or the like because of simple fabrication process.

The hydrophobic fiber sheet used for the innermost layer has a water resistance as determined according to JIS L-1092 5.1.1A of at least 5 cmH$_2$O, preferably at least 10 cmH$_2$O and an air permeability as determined according to JIS L-1096 6.27.1A of at least 10 cc/cm$^2$/sec, preferably at least 20 cc/cm$^2$/sec. These condition must also be satisfied where the innermost layer and the intermediate layer are used after being integrally laminated with each other. In this case, with an intermediate layer of a fiber having high equilibrium moisture content, such as cellulosic fiber, the water resistance may often decrease depending on the lamination process employed and hence requires close attention. If the air permeability is less than 10 cc/cm$^2$/sec, vapor generating from the food contained therein will not sufficiently diffuse into the absorbent fiber sheet and moisten the food surface. If the water resistance is less than 5 cmH$_2$O, the moisture once absorbed into the absorbent fiber sheet will return to and through the hydrophobic fiber sheet and moisten the food surface. The use of an impermeable sheet for the outer layer prevents the food wrapped from drying up to an abnormal degree, as well as preventing fluid materials contained in the food such as sauce, ketchup and butter from oozing outwardly.

Any hydrophobic fiber sheet can be used for the innermost layer insofar as it satisfies the conditions of the water resistance and air permeability, but it is preferred that one satisfying the above conditions and comprising no additive or treating agent from the viewpoint of food safety. Preferred examples of the sheet are melt-blown nonwoven fabrics of polyolefins, such as polyethylene and polypropylene, having a fiber diameter of not more than 10 $\mu$m and a weight of 3 to 50 g/m$^2$, preferably 5 to 30 g/m$^2$. Melt-blown nonwoven fabrics of polyester or polyamide generally do not exhibit a sufficient water resistance unless they are treated with a water repellent agent. Polyolefins are preferred since they need not be repellent-treated and generate no toxic gas when disposed by burning after use. Polypropylene has high melting point and is most preferred for use in microwave. With a weight of less than 3 g/m$^2$, the sheet can hardly exhibit a sufficient water resistance, while that of more than 50 g/m$^2$ decreases vapor permeability and is uneconomical. The melt-blown nonwoven fabrics used preferably comprise a fiber having as small a fineness as possible and dispersed therein as uniformly as possible in view of water resistance and air permeability. While the strength of a melt-blown nonwoven fabric generally decreases with decreasing fineness of the constituting fiber, this is improved by lamination with another sheet such as polyolefin spunbonded nonwoven fabric or thermo-bonded fabric. The aforedescribed integral lamination with the intermediate layer can also serve for this purpose and is preferred.

The absorbent fiber sheet used for the intermediate layer absorbs water drops which have been generated from the food contained therein passed through the innermost layer and condensed by cooling on the inner surface of the outer layer. This layer also functions as a heat insulation layer. Here the fiber constituting the sheet need not necessarily be absorbent as long as the sheet itself is water absorbent. Thus the constituting fiber may simply be a synthetic hydrophilic fiber and have no absorptive capacity by itself. From the viewpoint of food safety, it is preferred to use nonwoven fabrics containing no additives or treating agents, comprising a cellulosic fiber such as pulp or rayon, and produced by dry-laid, wet-laid or spunbonded process. Desirable level of the water absorbency of the absorbent fiber sheet varies depending on the water content of the food to be wrapped, wrapping shape and other conditions. With bags used to contain for example hamburger, a water absorption of at least 50 g/m$^2$ is sufficient, while that of at least 70 g/m$^2$ may serve for foods such as pizza pie, which is particularly apt to be affected by moisture, and fried chicken, which has a high water content. The water absorbancy herein is determined according to a modified JIS L-1096 6.26.2 comprising immersing a square speciment sheet in water and then, instead of squeezing, hanging it as it is in the air with its one side held horizontally for 5 minutes to drop off excess water, followed by measurement of the water contained in the specimen and expressed in grams per 1 m$^2$. The absorbent fiber sheet may contain a fusible synthetic fiber for reinforcement of the sheet within a limit not to impair the water absorbency. The absorbent sheet preferably has a weight of 5 to 100 g/m$^2$. A weight of less than 5 g/m$^2$ cannot provide a sufficient water absorbency, while with a weight exceeding 100 g/m$^2$ the sheet is, although sufficient in water absorbency, too thick and uneconomical.

The hydrophobic fiber sheet and the absorbent fiber sheet can be used after being integrally laminated with each other by various processes. Thus, the integration is conducted by direct melt-blowing onto an absorbent fiber sheet, calendering a laminate of an absorbent fiber sheet and a hydrophobic fiber sheet, each prepared separately, with a flat calender to lightly adhere them wholly with each other while paying attention not to damage the water absorbency, or partially bonding a laminate of the two by thermal embossing or ultrasonic fusion. In conducting partial bonding, it is generally preferred that the area bonded amounts to 1 to 30% of the total in view of a balance between water absorbency, air permeability, strength and like properties. The applicable ratio of bonding area however varies depending on the weights of the sheets bonded and therefore is not limited to this range.

The impermeable sheet used for the outside layer prevents inside water, oil and the like from oozing out. Preferred impermeable sheets are one comprising a layer of paper such as tissue or cardboard laminated with a thin film of polyethylene or polypropylene, one comprising only one layer of polyethylene, polypropylene or polyester, one comprising laminate of polyethylene, polypropylene and/or polyester and the like. Among the above, one comprising a paper layer such as tissue laminated with a thin film of polyethylene or polypropylene is more preferred from the viewpoints of printability on the surface and heatsealability. The use of cardboard enables the entire laminate to be fabricated into box shape, which can protect the food contained from crushing when the boxes are piled up, and hence is also preferred. Laminated sheets comprising a layer of aluminum foil is, in spite of the foil being impermeable, not preferred since they are not microwaveable. It however is acceptable to use aluminum foil partially and in a limited range of area not to impair the microwaveability. In this case the position and size of the aluminum foil should carefully be selected so that the food contained are not heated unevenly.

The effect of the present invention can fully be produced when the innermost, intermediate and outer layers are simply placed one upon another and then fabricated into bags. It is however preferred in view of easy handling upon wrapping foods to consolidate them by bonding linearly or intermittently through heat embossing, ultrasonic fusion or like processes. Planar, overall bonding is not necessary and, for example for bags, it is sufficient to so bond the peripheral part of their open end as to assure easy handling.

The composite sheets thus prepared are used for wrapping various foods including hamburger, hot dog, fried chicken, fried potato, OKONOMIYAKI, TAKOYAKI and chow mein, with the hydrophobic fiber sheet layer being so positioned as to contact the contents. The composite sheets may first be cut into square or rectangular sheets, which are then used for wrapping foods, the foods thus wrapped being subsequently, as required, placed in boxes. Preferred however is to fabricate the composite sheets into bags with their two or three sides sealed. Also preferred are boxes made from the composite sheets comprising a layer of cardboard. The bags may, if necessary, be provided with a gore, sealed at the end by folding back or heatsealing, after foods have been placed therein. Boxes of foldable type are also preferred since they are compact when folded before use and require only a small space to stock, and can, after having contained foods, be piled up during storage.

Other features of the invention will become apparent in the course of the following descriptions of exemplary embodiments which are given for illustration of the invention and are not intended to be limiting thereof.

EXAMPLES

EXAMPLE 1 AND COMPARATIVE EXAMPLE 1

A 2-layered sheet was prepared by laminating a melt-blown nonwoven fabric having a weight of 5 g/m$^2$ and comprising polypropylene fiber having an average fiber diameter of 3 μm with a wet-laid nonwoven fabric comprising wood pulp and having a weight of 13 g/m$^2$, and then bonding the two layers by pinpoint embossing. The area bonded by the embossing occupied about 6% of the total. The sheet showed a water resistance of 10 cmH$_2$O and an air permeability of 45 cc/cm$^2$/sec. The sheet thus obtained was laminated on an impermeable sheet obtained by laminating a tissue with a polyethylene film having a thickness of about 10 μm, with the polyethylene film side contacting the pulp nonwoven fabric. The laminate was cut into rectangular sheets and the cut sheets were each folded in two and one side of the fold was heatsealed to give bags the two sides of which are closed, as shown in FIG. 1. The 2-layered sheet and impermeable sheet of the two open sides are each linearly heatsealed as shown in FIG. 1.

Warm hamburgers just after being cooked were placed in the bags and the bags were sealed by folding the open sides. The contents were still warm after 20 minutes, with the surface being not wet or moistened, and tasted good. As Comparative Example 1, bags were prepared in the same manner as above from the above impermeable sheet only and tested by wrapping the same hamburgers. After 20 minutes, the contents felt somewhat cooled and did not taste good since their surface was wet with condensed water. They were a little deformed due to the wetting.

EXAMPLE 2

Bags having a gore on their side were fabricated using the 2-layered sheet and impermeable sheet prepared in Example 1. Hot dogs were each wrapped in the thus obtained bags, and the bags were sealed at their open end. These bags did not permit the liquid contained to ooze out even when they were placed upside down or laid flat. The bags were also heated in a microwave. The hot dogs taken then from inside tasted good with their surface feeling dry and their shape showing no change.

COMPARATIVE EXAMPLE 2

The impermeable sheet and nonwoven pulp fabric used in Example 1 were laminated with each other, and used for top and bottom surfaces of a bag having the same shape as that in Example 2. A perforated polyethylene film was used for making the gore. A hot dog was wrapped in the bag thus prepared and the open end of the bag was sealed. Ketchup oozed out through the fine holes of the polyethylene film when the bag with the contents was placed upside down or laid flat. The bag was then heated in a microwave and then taken out for check. The nonwoven pulp was wet with condensed water drops and part of the hot dog that had touched the wet part was moistened on the surface and did not taste good.

EXAMPLE 3 AND COMPARATIVE EXAMPLE 3

Figure 4:
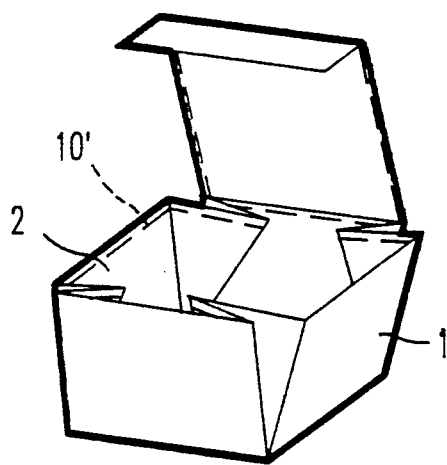
FIG. 4 is a perspective view of still another embodiment of the present invention, comprising a foldable box; where 1 is impermeable sheet,
2 is laminated sheet,
2a is a hydrophobic fiber sheet,
2b is absorbent fiber sheet, and
10 and 10' are thermo-bonded parts.

A laminated nonwoven fabric sheet comprising a hydrophobic fiber layer and an absorbent fiber layer was obtained by directly blowing a melt-blown polypropylene nonwoven fabric having a weight of 7 g/m$^2$ and an average fiber diameter of 5 μm onto one side of a thermo-bonded nonwoven fabric having a weight of 20 g/m$^2$ and comprising 70% by weight of rayon fiber and 30% by weight of a fusible polyethylene binder fiber. The nonwoven fabric sheet thus obtained showed a water resistance of 29 cmH$_2$O and an air permeability of 107 cc/cm$^2$/sec. The nonwoven sheet was laminated with an impermeable sheet obtained by laminating a polyethylene film having a thickness of about 10 μm on a cardboard in such a way that the absorbent fiber layer touched the polyethylene film, and the laminate was consolidated by pinpoint embossing. The composite sheet thus obtained was fabricated into a foldable box as shown in FIG. 4. Warm fried chicken was placed in the box thus prepared and the box was closed and allowed to stand at a room temperature. After 20 minutes, the fried chicken was still warm and had a dry surface. After additional 1 hour, the box with the contents was heated in an microwave. Then, the fried chicken had a dry surface and tasted good. As Comparative Example 3, a box having the same shape as above was fabricated from a composite sheet comprising a laminate of the polyethylene film with the cardboard, without the nonwoven fabric sheet, and subjected to the same test. After 20 minutes's standing at a room temperature the fried chicken was a little cooled and its surface was a little moistened. After further 1 hour, the box with the contents was heated in the microwave. Then the fried chicken had a surface moistened allover and did not taste so good.

Obviously, numerous modifications and variations of the invention are possible in light of the above teachings. It is therefore to be understood that within the scope of the appended claims, the invention may be practiced otherwise than as specifically described herein.

What is claimed is:

1. A wrapping for foods comprising a laminated composite sheet which comprises a fluid impermeable sheet as an outer layer, an absorbent fiber sheet as an intermediate layer and a hydrophobic fiber nonwoven fabric as an innermost layer that touches the food wrapped therein, said hydrophobic fiber nonwoven fabric having a water resistance of at least 5 cmH$_2$O and an air permeability of at least 10 cc/cm$^2$/sec.

2. A wrapping for foods according to claim 1, wherein said hydrophobic fiber nonwoven fabric has a water resistance of at least 10 cmH$_2$O and an air permeability of at least 20 cc/cm$^2$/sec.

3. A wrapping for foods according to claim 1, wherein said hydrophobic fiber nonwoven fabric is a polyolefin melt-blown nonwoven fabric.

4. A wrapping for foods according to claim 1, wherein said absorbent fiber sheet is a nonwoven fabric principally comprising cellulosic fibers.

5. A wrapping for foods according to claim 1, wherein said impermeable sheet is a laminate of paper and polyethylene film with said paper facing outward.

6. A wrapping for foods according to claim 1, said wrapping having been fabricated into bags.

7. A wrapping for foods according to claim 1, said wrapping having been fabricated into boxes.

8. A wrapping for foods according to claim 1, wherein absorbent fiber sheet is a paper principally comprising cellulosic fibers.

* * * * *